(12) United States Patent
Appleyard et al.

(10) Patent No.: US 9,037,964 B2
(45) Date of Patent: May 19, 2015

(54) PROVIDING DIRECT MANIPULATION OF AN ANALYTICS DATA VISUALIZATION WITHIN AN ANALYTICS REPORT

(75) Inventors: James P. Appleyard, North Richland Hills, TX (US); Gregory P. Fitzpatrick, Keller, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 13/349,101

(22) Filed: Jan. 12, 2012

(65) Prior Publication Data

US 2013/0185624 A1     Jul. 18, 2013

(51) Int. Cl.
*G06F 17/21*     (2006.01)
*G06F 17/22*     (2006.01)

(52) U.S. Cl.
CPC .................................. *G06F 17/2247* (2013.01)

(58) Field of Classification Search
CPC .................................................. G06F 17/2247
USPC ........................................................ 715/234
See application file for complete search history.

(56) References Cited

U.S. PATENT DOCUMENTS

| | | | |
|---|---|---|---|
| 7,302,639 B1 | 11/2007 | Everhart et al. | |
| 7,559,048 B1 | 7/2009 | Bedell et al. | |
| 2004/0193616 A1* | 9/2004 | Pharies et al. | 707/100 |
| 2006/0070013 A1* | 3/2006 | Vignet | 715/854 |
| 2007/0033088 A1 | 2/2007 | Aigner et al. | |
| 2008/0192056 A1* | 8/2008 | Robertson et al. | 345/440 |
| 2009/0138427 A1 | 5/2009 | Kalavade | |
| 2009/0287617 A1* | 11/2009 | Schmidt | 706/10 |
| 2010/0005008 A1* | 1/2010 | Duncker et al. | 705/27 |
| 2010/0005411 A1* | 1/2010 | Duncker et al. | 715/769 |
| 2010/0214299 A1* | 8/2010 | Robertson et al. | 345/440 |
| 2012/0036494 A1* | 2/2012 | Gurumohan et al. | 717/106 |

OTHER PUBLICATIONS

Safari HTML5 Canvas Guide, Apple Inc., Published Mar. 14, 2011, retrieved from https://web.archive.org/web/20110815083949/http://developer.apple.com/library/safari/documentation/AudioVideo/Conceptual/HTML-canvas-guide/HTML-canvas-guide.pdf on Apr. 29, 2014, p. 1-170.*

Hudson et al., HTML5 Developer's Cookbook, Addison-Wesley Professional, ISBN-10: 0-321-76938-4, Published Dec. 6, 2011, p. 127-162.*

Nathan et al., Convert XML to JSON in PHP, IBM, Published Jun. 5, 2007, retrieved at http://www.ibm.com/developerwords/library/x-xml2jsonphp on Apr. 29, 2014, p. 1-8.*

\* cited by examiner

*Primary Examiner* — Frank D Mills
(74) *Attorney, Agent, or Firm* — Patents on Demand P.A.; Brian K. Buchheit; Scott M. Garrett

(57) ABSTRACT

A direct manipulation event associated with a chart of an analytics report can be detected. The event can be a user interface input and the chart can be an information graphic. The graphic can be a graphically rendered HTML compliant element and a data set. The report can conform to a JAVASCRIPT OBJECT NOTATION (JSON) format. The analytics report can be presented within a browser. An action can be run responsive to the detecting. The action can be an immediate rendering of the graphic based on the event. When the action executes a request for data not in the data set data from a different data set can be obtained. When the action executes a request for data in the data set, the data from the data set can be automatically retrieved. The analytics data can be immediately rendered as a chart within the canvas element of an HTML document.

19 Claims, 5 Drawing Sheets ically a chart within an analytics report. In addition, U.S. 9,037,964 B2

PROVIDING DIRECT MANIPULATION OF AN ANALYTICS DATA VISUALIZATION WITHIN AN ANALYTICS REPORT

BACKGROUND

The present invention relates to the field of business analytics and, more particularly, to providing direct manipulation of an analytics data visualization within an analytics report.

Analytics often provide key insight into industry changes which companies can frequently leverage to achieve success. Analytic processes can analyze and organize data (e.g., from a database) into human readable analytics reports which can aid business analysts in making critical business decisions. Frequently, reports can be generated from enormous data stores (e.g., Big Data) which can reduce large quantities of data into smaller, intelligible data sets. These data sets can provide a limited amount of analytics data in the form of charts. For example, analytics reports often include a number of static representations like pie charts, bar charts, and line charts which indicate trends in a data set. These charts can be atomic graphical objects (e.g., JPGs, PNGs) which can be presented within a Web document. For example, an analytics report can be a Hypertext Markup Language (HTML) document including an image of a sales chart. That is, the charts within traditional analytics reports can be static entities which the user cannot manipulate further without manually refining the queries associated with a given chart. Manual refining typically involves recreating the report which can consume computing resources (e.g., network, storage) unnecessarily. Further, manual refining can be time consuming and difficult for users with no experience in analytics report authoring.

In many instances, analytics reports can be accessed easily as Web documents via a Web browser. In these instances, mobile devices are frequently utilized to view charts and/or graphs of analytics reports. For example, business executives who frequently travel can utilize mobile phones to access pivotal analytics reports. As such, mobile devices which frequently have limited capabilities (e.g., power/processor/screen size constraints) can present major hurdles for obtaining analytics data not presented within an analytics reports. For example, large data sets are often associated with analytics reporting tools and cannot be communicated to mobile devices to perform report creation capabilities. Additionally, many analytics reporting software can be complex server-side tools which cannot be utilized on a mobile device. Consequently, analytics reports can benefit from improved customization and enhanced usability.

BRIEF SUMMARY

One aspect of the present invention can include a system, an apparatus, a computer program product, and a method for providing dynamic information graphic customization to an analytics report. A direct manipulation event associated with a chart of an analytics report can be detected. The event can be a user interface input and the chart can be an information graphic. The graphic can be a graphically rendered HTML compliant element and a data set. The report can conform to a JAVASCRIPT OBJECT NOTATION (JSON) format. The analytics report can be presented within a browser. An action can be run responsive to the detecting. The action can be an immediate rendering of the graphic based on the event. When the action executes a request for data not in the data set data from a different data set can be obtained. When the action executes a request for data in the data set, the data from the data set can be automatically retrieved. The analytics data can be immediately rendered as a chart within the canvas element of an HTML document.

Another aspect of the present invention can include an apparatus, a computer program product, a system, and a method for providing dynamic information graphic customization to an analytics report. An Extensible Markup Language (XML) formatted analytics report associated with a Representational State Transfer (REST) compliant communication can be identified. The REST compliant communication can be associated with a requesting entity. The report can be dynamically converted to a JavaScript Object Notation (JSON) format and can be conveyed to the requesting entity as an enhanced report. The converting can occur within the presentation layer. The presentation layer can be a data organization layer of the Open Systems Interconnect (OSI) model. A chart of the enhanced report can be presented within the canvas element of a Hypertext Markup Language (HTML) document. The HTML document can be presented within a browser interface of the requesting entity. The chart can be immediately modified within the application level of the browser interface responsive to a user interface event. The event can be a user initiated input manipulating a portion of the chart.

Yet another aspect of the present invention can include an apparatus, a computer program product, a method, and a system for providing dynamic information graphic customization to an analytics report. A reporting engine can be configured to permit object level analytics report deconstruction, manipulation, and rendering of a chart within an analytics report. The analytics report can be a JavaScript Object Notation (JSON) compliant report. The analytics report can be a dynamically generated report and a previously generated report. The analytics report can be associated with analytics data. A data store can be able to persist an analytics report, a conversion ruleset, and a rendering ruleset.

A reporting engine can be configured to permit object level analytics report deconstruction, manipulation, and rendering. The analytics report can be a JavaScript Object Notation (JSON) compliant report. The analytics report can be a dynamically generated report and a previously generated report. The analytics report can be associated with analytics data. A data store can be able to persist an analytics report and a rendering ruleset.

DETAILED DESCRIPTION

Figure 1:
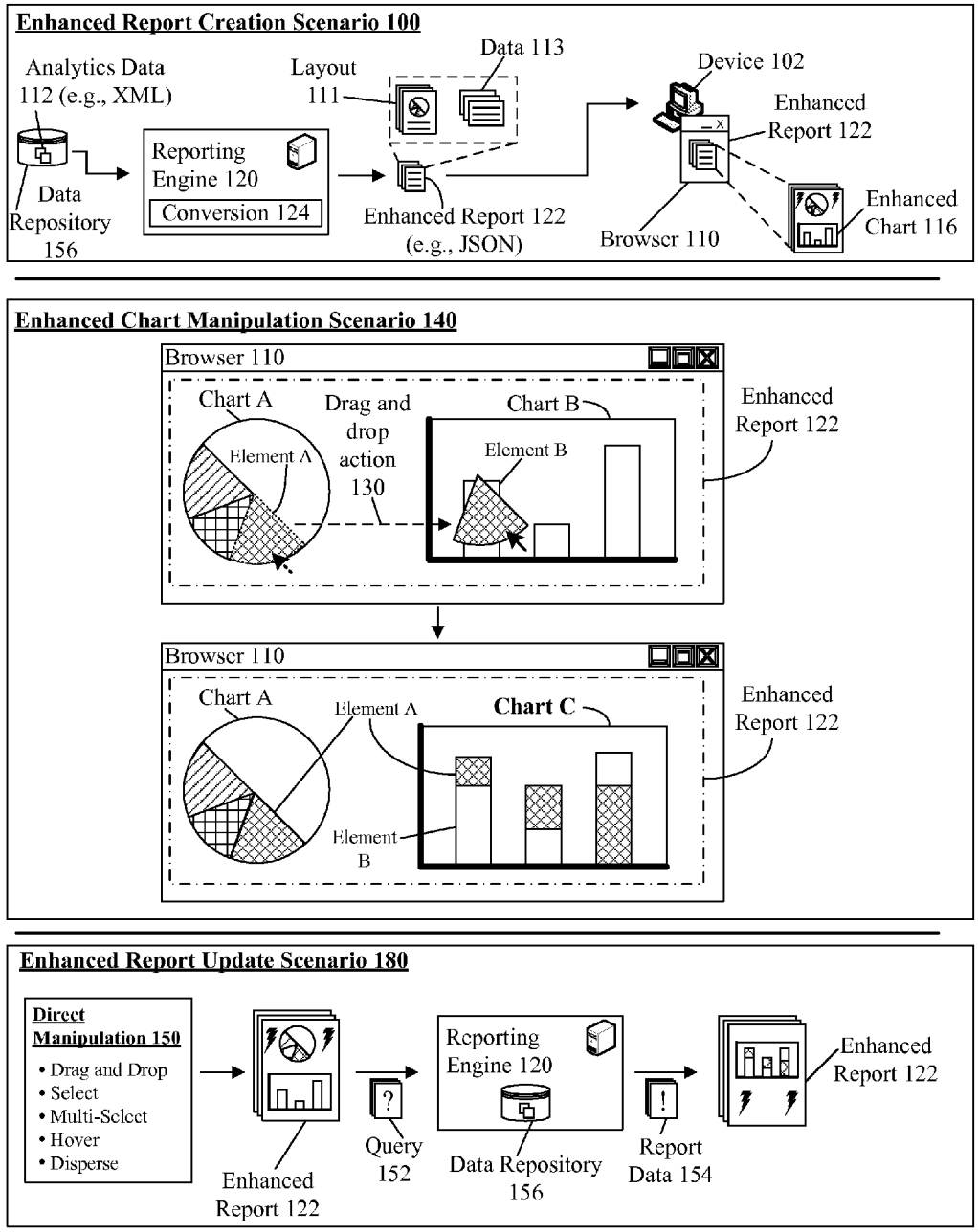
FIG. 1 is a schematic diagram illustrating a set of scenarios for providing direct manipulation of an analytics data visualization within an analytics report in accordance with an embodiment of the inventive arrangements disclosed herein.

The present disclosure is a solution for providing direct manipulation of an analytics data visualization within an analytics report. In the solution, a reporting framework can permit an information graphic (e.g., chart) within an analytics report to be dynamically manipulated within an interface. Manipulation can trigger the visual modification of an information graphic. Visual modification can include, but is not limited to, combining two or more charts, dispersing a chart, adding a data set to a chart, removing a data set from a chart, and the like. Manipulation can include, but is not limited to, drag and drop, select, multiple select, hover, disperse, and the like. It should be appreciated that the visual modification is a presentation layer functionality and can be rendered immediately.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a set of scenarios 100, 140, 180 for providing direct manipulation of an analytics data visualization within an analytics report in accordance with an embodiment of the inventive arrangements disclosed herein. Scenario 100, 140, 180 can be present in the context of method 200A, 200B, system 300, and embodiment 400. Scenario 100, 140, 180 illustrate an enhanced report creation, an enhanced chart manipulation, and an enhanced report update scenario associated with the disclosure. It should be appreciated that scenario 100, 140, 180 can be performed in any sequence and is not limited to the arrangement disclosed herein. Scenario 100, 140, 180 can be associated with an enhanced report 122 which can be an improved analytics report including a layout 111 portion and a data 113 portion. Layout 111 can permit rendering of data 113 within browser 110 (e.g., Web browser) which can include data 113 represented as enhanced chart 116. The layout 111 can be manipulated via user input (e.g., drag and drop) without affecting the data 113. That is, a user can affect visually changes to chart 116 and/or report 122 contents within a browser 110.

In scenario 140, enhanced charts 116 can be dynamically altered based on user input (e.g., direct manipulation 150). That is, the chart 116 can be graphically altered within the interface 110 through direct manipulation of chart elements (e.g., Element A, Element B). For example, a user can reorder the elements of a bar graph (e.g., Chart B) manually moving each bar element (e.g., Element B) to a desired position within the graph. In scenario 180, query 152 and report data 154 can be communications which can permit the dynamic properties of enhanced report 122 and/or enhanced chart 116 to be achieved. It should be appreciated that scenario 100, 140, 180 are for illustrative purposes only and should not be construed to limit the invention in any regard.

As used herein, an enhanced report 122 can be an analytics reporting artifact able to present analytics data 113 textually and/or graphically within browser 110. Report 122 can include, but is not limited to, layout 111, data 113, metadata, settings, and the like. Layout 111 can be a Web formatted document including layout information which can be utilized to render chart 116 from data 113. Layout 111 can be associated with the visual rendering of data 113 which can include, but is not limited to a page layout, a graphics layout, and the like. Layout information can include, but is not limited to, position, size, scaling data, chroma information, presentation information (e.g., style sheets), and the like. For example, layout can include information for positioning of enhanced chart 122 (e.g., Chart A) within a Web page. It should be appreciated that layout 111 permits the separation of presentation (e.g., style) and data (e.g., content) and can enable easy manipulation of analytic report charts using conventional client side technologies (e.g., JavaScript/CSS). That is, report 122 and chart 116 manipulation can be browser independent. In one instance, report 122 can be a component of a Web application data mashup. In the instance, chart 116 can be a visually modifiable portion of the data mashup.

In one instance, layout 111 can conform to a Hypertext Markup Language (HTML) format. In the instance, layout 111 can be programmatically altered using JavaScript and/or Cascading Style Sheet executable code. For example, layout 111 can utilize features of CSS3 (e.g., canvas element) to enable "in-browser" manipulation of chart 116 which is traditionally unavailable. That is, report 122 can represent an improvement over traditional static analytics reports which can be visually immutable without special reporting software tools. Data 113 can be a sub-set of analytics data 112 (e.g., Big Data). For example, data 113 can be generated from a cost projection analysis query of a sales database. It should be appreciated that data 113 can include data from repository 156, data from a different repository, and the like. For example, data 113 can include analytics data associated with multiple queries of three different databases. Chart 116 can be a presentation of data 113 utilizing layout 111. Chart 116 can include, but is not limited to, a diagram, a graph, a table, a map, and a list. Chart 116 type can include, but is not limited to, a bar chart, a pie chart, a line chart, a stacked bar chart, a histogram, and the like. Chart 116 can include traditional and/or non-traditional components. Traditional components can include, axes, data representation (e.g., bar, line, section), and the like. Non-traditional components can include, but is not limited to, a grab handle (e.g., for repositioning), an interactive border (e.g., visual notification), a control panel, and the like. For example, each chart 116 within report 122 can be associated with a control panel toolbar which can present useful functionality (e.g., disperse, select, share) associated with the chart 116.

In enhanced report creation scenario 100, report 122 can differ from traditional analytics reports which can include information organized in a graphical manner conforming to a traditional and/or proprietary image format. For example, a data 113 can be traditionally rendered as a bitmap image of a bar chart indicating the sales for a historic year. Analytics data 112 can be automatically processed to permit dynamic visual customization through the use of reporting engine 120. Data 112 can be conveyed to a reporting engine 120 via one or more conventional and/or proprietary mechanisms. Reporting engine 120 can perform conversion 124 which can convert data 112 to an enhanced report 122 compliant format. In one instance, the data 112 can be an Extensible Markup Language (XML) compliant document which can be automatically converted into an enhanced report 122 which can be a JavaScript Object Notation (JSON) compliant document.

The conversion 124 can be subject to one or more conversion rules (e.g., rules 336, settings 328) which can be automatically and/or manually established. The enhanced report 122 can be communicated to device 102 which can present report 122 within browser 110. Within browser 110, user customizations can be performed through direct manipulation of chart 116 elements which can be illustrated within scenario 140.

In enhanced chart manipulation scenario 140, a user can dynamically interact with enhanced chart 116 within a browser 110. Report 122 can be manipulated at the application level by browser 110 functionality from user input (e.g., direct manipulation 150). In one example, enhanced chart 116 can include Chart A and Chart B which can be combined responsive to a drag and drop action 130. That is, a traditional user interaction input can permit easy interaction and manipulation of chart 116. In drag and drop action 130, a user can select Element A of Chart A, drag the Element A to Chart B, and drop the Element A onto Chart B. The action 130 can trigger a creation of a stacked Chart C including Element A data and Chart B data.

In one embodiment, direct manipulation 150 actions can cause the presentation of visual and/or aural notifications within browser 110. For example, the perimeter of stacked Chart C can blink three times upon presentation to alert a user of the chart creation/modification. It should be appreciated that visual notifications (e.g., visual cues) can include animations, transitions, chroma changes, and the like.

It should be appreciated that action 130 represents an exemplary user action and can include other actions (e.g., direct manipulation 150). For example, a user can "drill down" on a Chart A (e.g., obtain more information about Element A) by double clicking on Element A. In one instance, a user can perform a layout reflow by moving Chart A and Chart B to different locations within the browser 110. It should be appreciated that the disclosure can permit robust chart manipulation common to analytics report tooling. For example, the disclosure can replicate basic chart manipulation (e.g., look and feel) of an IBM COGNOS ADAPTIVE ANALYTICS software.

In enhanced report update scenario 180, engine 120 can function to enable adaptable capabilities of report 122 by permitting report 122 to be dynamically updated. In one embodiment, direct manipulation 150 actions upon report 122 can trigger query 152 to be produced. Direct manipulation 150 can include, but is not limited to, a drag and drop action, a select action, a multi-select action, a hover action, a disperse action (e.g., deconstruct), and the like. In one instance, query 152 can be a local query which can access information within data 113. In another instance, query 152 can be a remote query which can access a non-local data repository 156. In the instance, query 152 can be communicated to engine 120 which can utilize data repository 156 to produce report data 154. For example, analytics data not originally included in data 113 can be retrieved and presented within report 122. That is, report 122 can be dynamically updated based on user interaction and/or preferences. Report 122 can be continually modified during a session and can be optionally persisted enabling exhaustive manipulations to be saved. In one instance, report 122 can be persisted as a template which can be utilized to generate subsequent reports which can mimic the layout of report 122.

Drawings presented herein are for illustrative purposes only and should not be construed to limit the invention in any regard. It should be understood that browser 110 can include, but is not limited to, a Web browser, a content browser, and the like. As used herein, a Web browser can include, but is not limited to, MOZILLA FIREFOX, APPLE SAFARI, GOOGLE CHROME, and the like. It should be appreciated that direct manipulation 150 can include traditional and/or proprietary user inputs. For example, gesture based input common to a GOOGLE ANDROID device (e.g., device 102) can be supported utilizing specialized input handling rules.

Figure 2A:
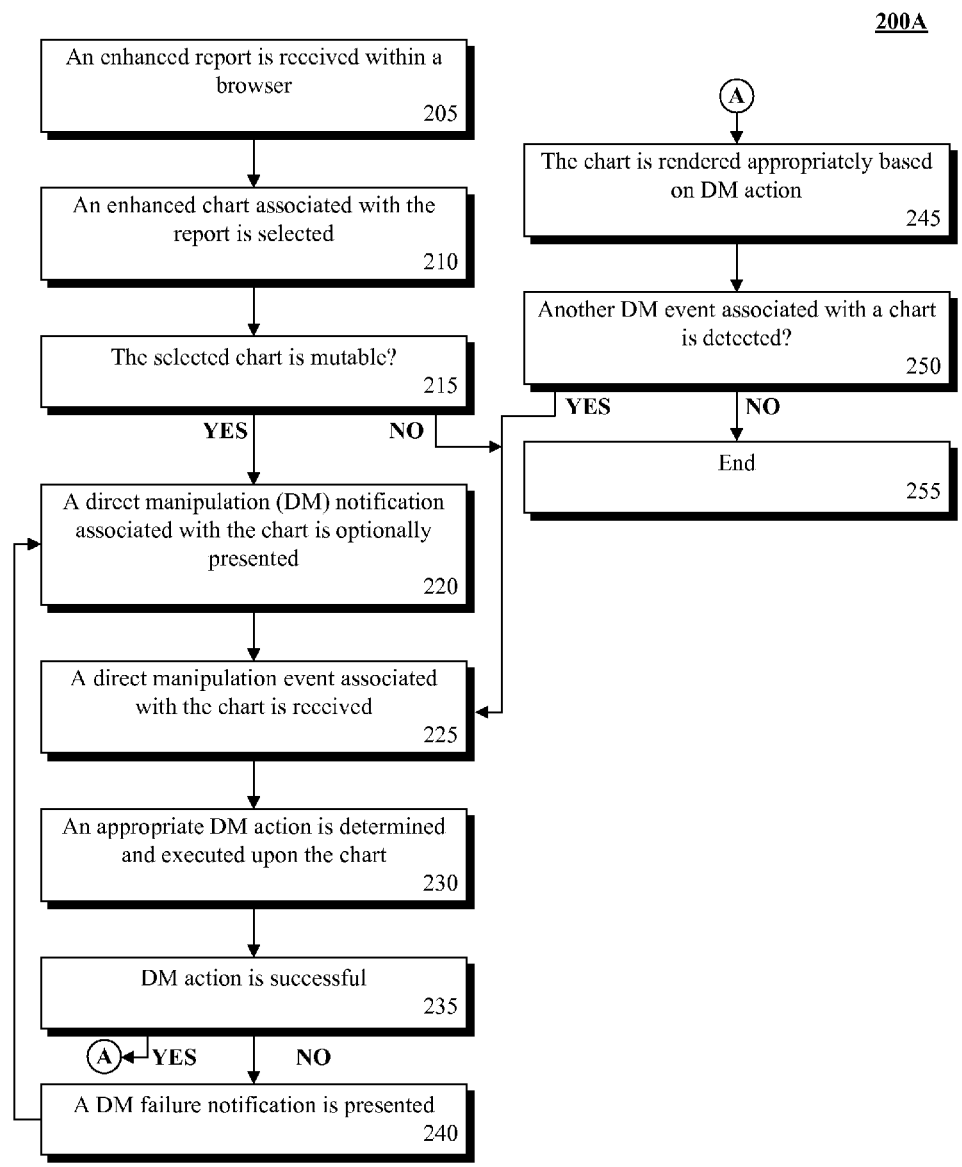
FIG. 2A is a schematic diagram illustrating a method for providing direct manipulation of an analytics data visualization within an analytics report accordance with an embodiment of the inventive arrangements disclosed herein.

FIG. 2A is a schematic diagram illustrating a method 200A for providing direct manipulation of an analytics data visualization within an analytics report in accordance with an embodiment of the inventive arrangements disclosed herein. Method 200A can be present in the context of scenario 100, 140, 180, system 300, and/or embodiment 400. Method 200A can represent a client-side process for enabling adaptive analytics reports. In method 200A, an enhanced report can be presented within a browser. The browser can receive user input which can be direct manipulations of an enhanced chart. The browser can immediately render changes to the enhanced chart resulting from direct manipulations.

In step 205, an enhanced report is received within a browser. The report can include one or more portions of data and/or layout information. In step 210, the enhanced chart associated with the report can be selected. Selection can be automatic or manually initiated. In one instance, a user can utilize a keyboard to select one or more enhanced charts to be manipulated. In step 215, if the selected chart is mutable, the method can continue to step 220, else continue to step 225. In step 220, a direct manipulation notification associated with the chart can be optionally presented. For example, the notification can include highlighting the border of the chart to indicate adjustment is permitted.

In one instance, the disclosure can permit security measures to be associated with the enhanced report. Security measures can include authorization mechanisms, verification actions, mutability settings, and the like. For example, an enhanced chart can be locked restricting a user from changing the type of chart but permitting other adjustment actions to be permitted.

In step 225, a direction manipulation event associated with the chart can be received. In one instance, the event can be received by an input handler (e.g., input handler 358) associated with the browser. In step 230, an appropriate direct manipulation action can be determined and processed upon the chart. In one instance, the manipulation action can be determined by analyzing one or more rulesets. In one embodiment, direct manipulation ruleset can permit the association of touchscreen gestures to trigger a direct manipulation action. That is, the disclosure can permit complex behaviors to be associated with a direct manipulation action. Rulesets can be heuristically determined based on historic actions, group settings, and the like. In step 235, if the direct manipulation is successful, the method can proceed to step 245, else continue to step 240. In step 240, a direct manipulation notification can be presented. The notification can be a visual and/or aural notification. In one instance, the notification can be a pop-up dialog indicating an action failure. In another instance, notification can include a sound notification such as an operating system error sound.

In step 245, the chart can be rendered appropriately (e.g., ruleset 356, preferences 360) based on the direct manipulation action. In step 250, if another direct manipulation event associated with the chart is detected, the method can return to step 225, else continue to step 255. In step 255, the method can end.

Drawings presented herein are for illustrative purposes only and should not be construed to limit the invention in any regard. Method 200A can be performed in real-time or near real-time. Method 200A can be performed within the presentation layer of a client computing device. Method 200A can be performed in serial and/or parallel.

Figure 2B:
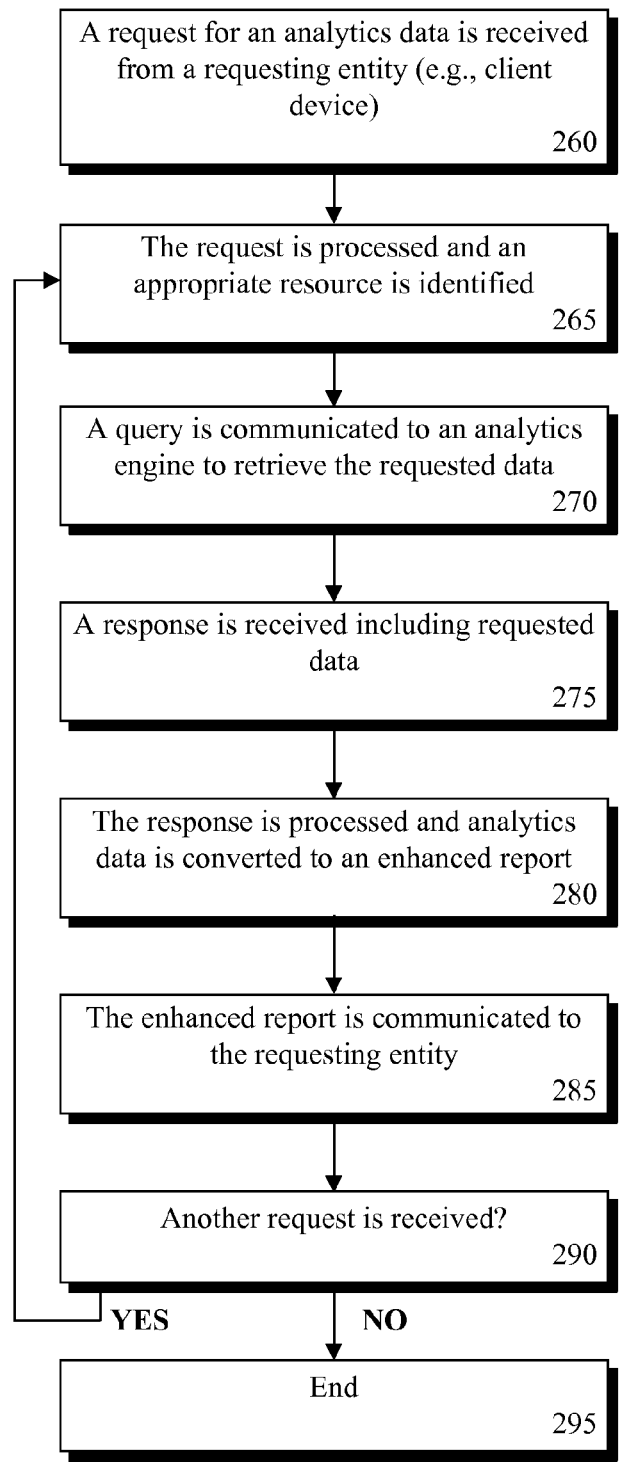
FIG. 2B is a schematic diagram illustrating a method for providing direct manipulation of an analytics data visualization within an analytics report in accordance with an embodiment of the inventive arrangements disclosed herein.

FIG. 2B is a schematic diagram illustrating a method 200B for providing direct manipulation of an analytics data visualization within an analytics report in accordance with an embodiment of the inventive arrangements disclosed herein. Method 200B can be present in the context of scenario 100, 140, 180, system 300, and/or embodiment 400. Method 200B can represent a server-side process for enabling adaptive analytics reports. In method 200B, a request for an analytics data can be received from a requesting entity. The request can be processed and an appropriate enhanced report can be generated. The report can be communicated to the request entity.

In step 260, a request for an analytics data can be received from a requesting entity. For example, the entity can be a client device such as a mobile phone. In step 265, the request can be processed and an appropriate resource can be identified. Resource identification can include manual and/or automatic processes. In one instance, a lookup table can be utilized to assist in the identification of an appropriate resource. In step 270, a query can be communicated to an analytics engine to retrieve the requested data. In step 275, a response can be received including requested data. In step 280, the response can be processed and analytics data can be converted to an enhanced report.

In step 285, the enhanced report can be communicated to the requesting entity. In step 290, if another request is received, the method can return to step 265, else continue to step 295. In step 295, the method can end.

Drawings presented herein are for illustrative purposes only and should not be construed to limit the invention in any regard. Method 200B can be performed in real-time or near real-time. Method 200B can be performed within the presentation layer of a server computing device. Method 200A can be performed in serial and/or parallel.

Figure 3:
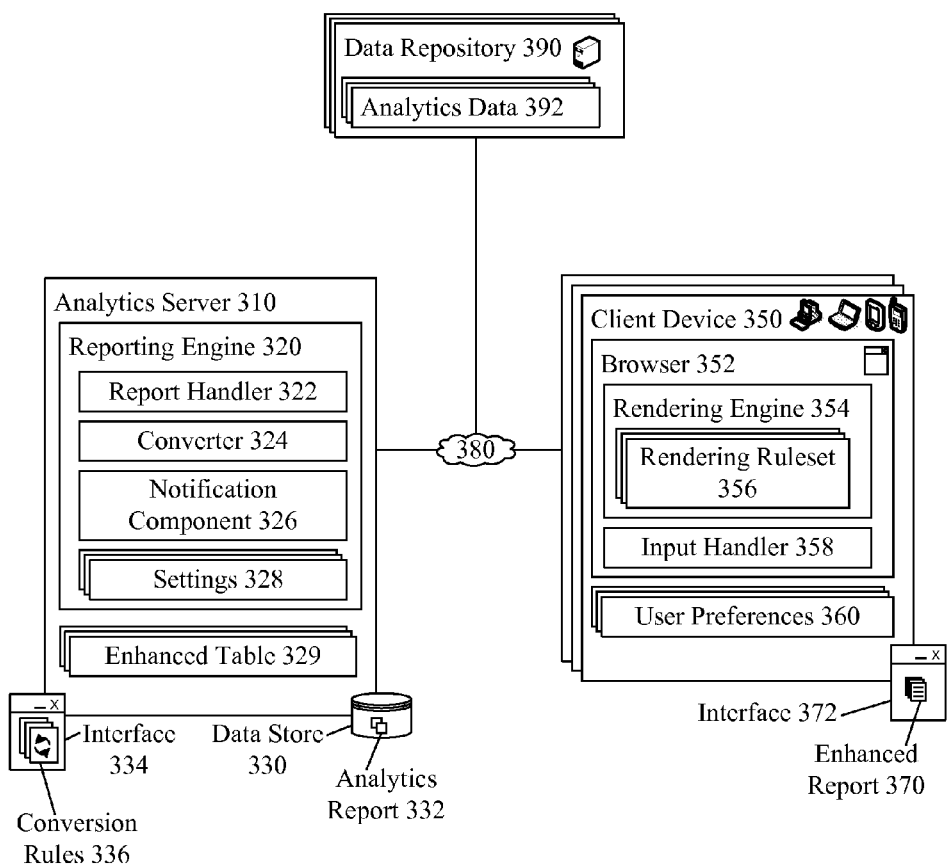
FIG. 3 is a schematic diagram illustrating a system for providing direct manipulation of an analytics data visualization within an analytics report in accordance with an embodiment of the inventive arrangements disclosed herein.

FIG. 3 is a schematic diagram illustrating a system 300 for providing direct manipulation of an analytics data visualization within an analytics report in accordance with an embodiment of the inventive arrangements disclosed herein. System 300 can be present in the context of scenario 100, 140, 180, method 200A, 200B, and/or embodiment 400. In system 300, a client 350 communicatively linked to an analytics server 310 can be utilized to dynamically interact an enhanced chart with an enhanced report 370. System 300 components 310, 350, 390 can be communicatively linked via one or more wired and/or wireless networks 380. In one embodiment of the system 300, engine 320 can utilize an existing analytics report 332 which can be converted to an enhanced report 370.

Analytics server 310 can be a hardware/software entity able to execute reporting engine 320. Server 310 can include, but is not limited to, reporting engine 320, data store 330, interface 334, enhanced table 329, and the like. Server 310 functionality can include, but is not limited to, authentication, verification, analytics collection, data analysis, data mining, session tracking, and the like. In one instance, server 310 can be a component of an IBM COGNOS software.

Reporting engine 320 can be a hardware/software element configured to facilitate enhanced report 370 creation and/or interaction. Engine 320 can include, but is not limited to, report handler 322, converter 324, notification component 326, settings 328, and the like. Engine 320 functionality can include, but is not limited to, component 322, 324, 326 communication, enhanced table 329 creation, table 329 maintenance, and the like. In one instance, engine 320 can be a networked computing element communicatively linked to server 310. In one embodiment, engine 320 functionality can be encapsulated within a Web based service (e.g., IBM COGNOS MASHUP SERVICE). In one instance, engine 320 functionality can be a component of an abstraction layer associated with a reporting tooling.

Report handler 322 can be a hardware/software entity able to enable report 370 usage. Handler 322 functionality can include, but is not limited to, enhanced report 370 creation, report 370 maintenance, and the like. Handler 322 can be utilized to retrieve analytics report 332, analytics data associated with report 332, and/or analytics data 392. Handler 322 can be permit communication with data repository 390 allowing query and retrieval of data 392. Handler 322 can be utilized to disassemble and/or reconstruct data associated with an enhanced report 370.

Converter 324 can be a hardware/software element for converting analytics data 392 and/or analytics report 332 to an enhanced report 370. Converter 324 functionality can include, but is not limited to, data conversion, data normalization, data import/export, character encoding conversion, and the like. In one instance, converter 324 can convert an Extensible Markup Language (XML) formatted document to a JavaScript Object Notation (JSON) formatted document. It should be appreciated that converter 324 is not limited to converting XML and can convert flat text, data objects, and the like. It should be understood that JSON can be one target format and converter 324 can be configured (e.g., rules 336) to convert data to one or more formats.

Notification component 326 can be a hardware/software entity for generating and/or presenting a notification associated with an enhanced report 370. Component 326 functionality can include, but is not limited to, a notification generation, notification forwarding, and the like. Notification can include, but is not limited to, an electronic message (e.g., report creation availability), a user interface (e.g., chart manipulation successful) dialog, and Short Message Service (SMS), voice notification, text exchange notification, and the like. In one instance, notification can be a JavaScript pop-up dialog presented within interface 372.

Settings 328 can be one or more rulesets for establishing the behavior of server 310, engine 320, and/or system 300. Settings 328 can include, but is not limited to, report handler 322 settings, converter 324 options, notification component 326 settings, and the like. In one instance, settings 328 can include enhanced table 329 options, enhanced report 370 settings, and the like. Setting 328 can be manually and/or automatically determined. In one instance, setting 328 can be configured via interface 334.

Enhanced table 329 can be a data set for enabling an enhanced report 370 configuration tracking. Table 329 can include, but is not limited to, an enhanced report identifier, an analytics data set, a user identity, and the like. For example, entry 338 of table 329 can permit user (e.g., User_A) manipulations associated with an enhanced report 370 (e.g., Enh_Rep_A) to be tracked and/or maintained. It should be appreciated that table 329 can enable session based tracking, intra-session based tracking, and the like. Table 329 can be manually and/or automatically generated. In one instance, table 329 can be presented within interface 334. In one embodiment, table 329 can permit multiple user manipulations associated with a collaboration session.

Data store 330 can be a hardware/software component able to persist analytics report 332, enhanced table 329, settings 328, and the like. Data store 330 can be a Storage Area Network (SAN), Network Attached Storage (NAS), and the like. Data store 330 can conform to a relational database management system (RDBMS), object oriented database management system (OODBMS), and the like. Data store 330 can be communicatively linked to server 310 in one or more traditional and/or proprietary mechanisms. In one instance, data store 330 can be a component of Structured Query Language (SQL) complaint database.

Analytics report 332 can be a traditional analytics document associated with an analytics data 392. Report 332 can include textual content and/or graphical content. Report 332 can include an analytics data 392 visually presented as a static image element. Image element format can include, but is not limited to, Joint Photographic Experts Group (JPEG), Portable Network Graphics (PNG), and the like. Report 332 can be associated with an analytics reporting software (e.g., report authoring suite).

Interface 334 can be a user interactive component permitting interaction and/or presentation of conversion rules 336 and/or settings 329. Interface 334 can be present within the context of a Web browser application, an analytics software suite, and the like. In one embodiment, interface 334 can be a screen of an IBM COGNOS software. Interface 334 capabilities can include a graphical user interface (GUI), voice user interface (VUI), mixed-mode interface, and the like. In one instance, interface 334 can be communicatively linked to server 310.

Conversion rules 336 can be one or rulesets for establishing the behavior of converter 324. Rules 336 can be automatically and/or manually established. Rules 336 syntax can include, but is not limited to, natural language syntax, structured syntax, and the like. In one instance, rules 336 can be presented within an administrative interface (e.g., interface 334). It should be appreciated that rules 336 can be dynamically altered during engine 320 run-time to improve conversion efficiency and/or accuracy.

Computing device 350 can be a hardware/software entity permitting the operation of browser 352. Device 350 can include, but is not limited to, browser 352, user preferences 360, interface 372, and the like. Computing device 350 can include, but is not limited to, a desktop computer, a laptop computer, a tablet computing device, a PDA, a mobile phone, and the like. Computing device 350 can be communicatively linked with interface 370.

Browser 352 can be a hardware/software element for retrieving, interacting, and/or presenting enhanced report 370. Browser 352 can include, but is not limited to, rendering engine 354, input handler 358, and the like. Browser 352 can execute within an operating system of a device 350. Browser 352 can be communicatively linked with interface 370. Browser 352 can receive user input within interface 372 (e.g., via input handler 358) and can perform application level rendering (e.g., using engine 354) responsive to the input.

Rendering engine 354 can be a hardware/software entity able to visually present report 370. Engine 354 can include, but is not limited to, a layout engine, a Web browser engine and the like. Engine 354 can display formatted content which can include, but is not limited to Hypertext Markup Language (HTML), HTML5, Extensible Markup Language, and the like. In one instance, engine 354 can process JavaScript and/or Cascading Style Sheet (e.g., CSS3) to enable dynamic manipulation of report 370.

Rendering ruleset 356 can be one or more rules for establishing the behavior of engine 354 and/or report 370 presentation. Rules 356 can be manually and/or automatically established. In one instance, rules 356 can be associated with an enhanced chart type, enhanced report 370, and the like. For example, a rendering rule 356 can be established for visually separating elements of an enhanced chart when a user initiates a disperse gesture. It should be appreciated that ruleset 356 can be arbitrarily complex and can be granular.

Input handler 358 can be a hardware/software element for receiving user input associated with interface 372 and/or browser 352. Handler 358 can be communicatively linked to hardware and/or software associated with device 350. For example, handler 358 can receive mouse based input to enable interaction with enhanced charts within enhanced report 370. Handler 358 can communicate input 358 to engine 354 which can utilize ruleset 356 to appropriately render enhanced report 370.

User preferences 360 can be one or more settings associated with a user of device 350, server 310, and/or system 300. Preferences 360 can include, but is not limited to, gesture shortcuts, saved templates, and the like. Preferences 360 can be automatically and/or manually established. In one instance, preferences 360 can be utilized by engine 354 during rendering of report 370. In the instance, preferences 360 can be applied to ruleset 356 to permit robust configuration of report 370.

Enhanced report 370 can include multiple analytic reports 332, multiple enhanced reports 370, and the like. In one instance, enhanced report 370 can be associated with a Uniform Resource Identifier (URI). In the instance, report 370 can be retrieved from a Uniform Resource Locator (URL). In one embodiment, report 370 can be associated with persisted as a template permitting users to rapidly recreate highly configurable reports. In the embodiment, interface 372 can permit template manipulation to allow iterative refinement of report 370. It should be appreciated that report 370 can be continually updated as data 392 changes.

Interface 372 can be a user interactive component permitting interaction and/or presentation of enhanced report 370, rendering rules 356, and/or preferences 360. Interface 372 can be present within the context of a Web browser application, a content browser, and the like. In one embodiment, interface 372 can be a screen of a rich Internet application. Interface 372 capabilities can include a graphical user interface (GUI), voice user interface (VUI), mixed-mode interface, and the like. In one instance, interface 372 can be communicatively linked to computing device 350.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), VPN and the like.

Data repository 390 can be a hardware/software element for persisting analytics data 392. Repository 390 can include, but is not limited to, analytics data 392, analytics report 332, and the like. Repository 390 can include, but is not limited to, a Storage Area Network (SAN), a Network Attached Storage (NAS), and the like. Repository 390 can conform to a relational database management system (RDBMS), object oriented database management system (OODBMS), and the like. In one instance, repository 390 can be an information repository. It should be appreciated that repository 390 can include multiple repositories which can be proximate or distally located. In one instance, repository 390 can be a component of Structured Query Language (SQL) complaint database. In one embodiment, repository 390 can be a data warehouse, a federated database, and the like.

Analytics data 392 can be an analytics artifact associated with a collection of numbers, characters, images, and the like. Data 392 can include qualitative attributes, quantitative attributes, and the like. In one instance, data 392 can include business analytics, Web analytics, and the like. It should be appreciated that data 392 can include unstructured data, structured data, and the like. In one embodiment data 392 can include a Big Data entity.

Drawings presented herein are for illustrative purposes only and should not be construed to limit the invention in any regard. It should be appreciated that notification component 326 can be an optional component of engine 320 and can be present in client 350. It should be understood that one or more components within system 300 can be optional components permitting that the disclosure functionality be retained. It should be understood that engine 320 components can be optional components providing that engine 320 functionality is maintained. It should be appreciated that one or more components of engine 320 can be combined and/or separated based on functionality, usage, and the like.

Figure 4:
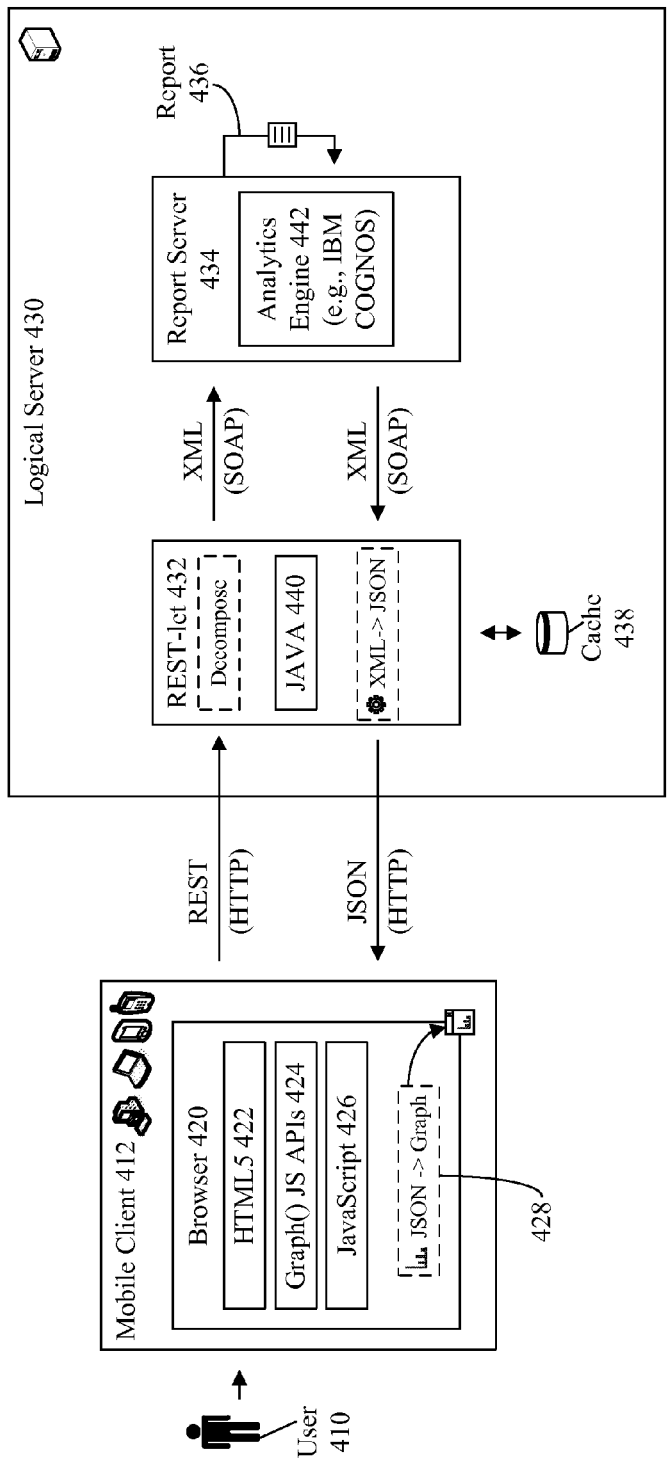
FIG. 4 is a schematic diagram illustrating an embodiment providing direct manipulation of an analytics data visualization within an analytics report in accordance with an embodiment of the inventive arrangements disclosed herein.

FIG. 4 is a schematic diagram illustrating an embodiment 400 for providing direct manipulation of an analytics data visualization within an analytics report in accordance with an embodiment of the inventive arrangements disclosed herein. Embodiment 400 can be present in the context of scenario 100, 140, 180, method 200A, 200B, and/or system 300. In embodiment 400, a logical server 430 can be communicatively linked with a mobile client 412. User 410 can directly manipulate a graph 428 (e.g., enhanced charts) associated with report 436 using a JavaScript Graph ( ) Application Programming Interface (API). In the embodiment, REST-let 432 can receive a Hypertext Transport Protocol (HTTP) communication for a report. The REST-let 432 can decompose the request to create a Simple Object Access Protocol (SOAP) communication to a report server 434. The analytics engine 442 of server 434 can retrieve report 436 which can be conveyed to REST-let 432 via a SOAP communication. The REST-let 432 can convert an Extensible Markup Language formatted report 436 to a JavaScript Object Notation (JSON) formatted structure. The JSON can be communicated via HTTP to client 412. Client 412 can render within browser 420 an enhanced version of report 436. Browser 422 can utilize HTML5 422, APIs 424, and JavaScript 426 to permit direct manipulations on graph 428.

It should be appreciated that the embodiment represents one configuration and can be modified to operate to fit existing systems. The embodiment can operate in part as a client-side (e.g., iOS, Android) process which can execute as HTML5 and JavaScript running in a browser (e.g., browser 420). The client 412 can utilize a Java-based server-side application (e.g., REST-let 432) running within the same network domain as the analytics compute node. The server-side application can invokes Web services provided by the analytics engine 442. In one configuration, the underlying server-side architecture can use a REST framework. The Web service invocation can return a report in XML format which can be then converted into a JSON (JavaScript Object Notation) object, which can be sent to the mobile client 412. The client 412 can process the JSON object and display the report in the browser.

Drawings presented herein are for illustrative purposes only and should not be construed to limit the invention any regard. The disclosure can be associated with a traditional and/or proprietary cache 438 enabling rapid retrieval of data and or report 436.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for performing direct manipulation on an analytics report comprising:
   detecting a direct manipulation (DM) event associated with an chart of an analytics report, wherein the DM event is a user interface (UI) input, wherein the chart is an information graphic, wherein the information graphic is at least one of a graphically rendered HTML compliant element and a data set, wherein the analytics report presented within a browser interface;
   responsive to the detecting, executing an appropriate DM action, wherein the DM action is an immediate rendering of the information graphic based on the DM event;
   when the DM action executes a request for analytics data not in the data set, obtaining the analytics data from a different data set from a different data repository;
   when the DM action executes a request for analytics data in the data set, automatically retrieving the requested data from the data set; and
   render the analytics data as an analytics chart within the canvas element of an HTML document; and
   dynamically converting the analytics chart from an Extensible Markup Language (XML) format to a JavaScript Object notation (JSON) format before the analytics report is presented within the browser, wherein the converting occurs within a presentation layer of the Open Systems Interconnect (OSI) model, wherein the DM action executes at an application level of the browser interface, wherein the conversion is subject to at least one conversion rule, wherein the at least one conversion rule can be dynamically altered during run-time.

2. The method of claim 1, wherein the report conforms to a JAVASCRIPT OBJECT NOTATION (JSON) format.

3. The method of claim 1, wherein the HTML element is an HTML5 element.

4. The method of claim 1, wherein the chart is at least one of a diagram, a graph, a table, a map, and a list.

5. The method of claim 1, wherein the DM event is detected within the application level of the browser interface.

6. The method of claim 1, wherein the user interface input is at least one of a drag and drop input, a select input, a multi-select input, a hover input, and a disperse input.

7. The method of claim 1, wherein the rendering is performed by a Document Object Model (DOM) script.

8. The method of claim 1, further comprising:
   presenting a notification associated with the chart within the browser interface, responsive to the rendering.

9. The method of claim 1, wherein the direct manipulation event triggers a drill down action associated with the chart.

10. The method of claim 1, wherein the DM action combines at least a portion of the chart with at least a portion of a different chart.

11. The method of claim 1, wherein the DM action is affected by a user preference setting.

12. The method of claim 1, wherein the chart is a data visualization of at least one of the analytics data and a different analytics data.

13. The method of claim 1, wherein the report is associated with a security measure, wherein the security measure is at least one of an authorization mechanism, a verification action, a mutability setting and a restriction on generation of the DM action.

14. A computer program product comprising:
   one or more non-transitory computer-readable, tangible storage devices;
   program instructions, stored on at least one of the one or more storage devices, to detect a direct manipulation (DM) event associated with an chart of an analytics report, wherein the DM event is a user interface (UI) input, wherein the chart is an information graphic, wherein the information graphic is at least one of a graphically rendered HTML compliant element and a data set, wherein the analytics report presented within a browser interface;
   program instructions, stored on at least one of the one or more storage devices, to, responsive to the detecting, execute an appropriate DM action, wherein the DM action is an immediate rendering of the information graphic based on the DM event;
   program instructions, stored on at least one of the one or more storage devices, to, when the DM action executes a request for analytics data not in the data set, obtain the analytics data from a different data set from a different data repository;
   program instructions, stored on at least one of the one or more storage devices, to, when the DM action executes a request for analytics data in the data set, automatically retrieve the requested data from the data set;
   program instructions, stored on at least one of the one or more storage devices, to, render the analytics data as a chart within the canvas element of an HTML document; and
   program instructions, stored on at least one of the one or more storage devices, to, dynamically convert the analytics chart from an Extensible Markup Language (XML) format to a JavaScript Object notation (JSON) format before the analytics report is presented within the browser, wherein the converting occurs within a presentation layer of the Open Systems Interconnect (OSI) model, wherein the DM action executes at an application level of the browser interface, wherein the conversion is subject to at least one conversion rule, wherein the at least one conversion rule can be dynamically altered during run-time.

15. The computer program product of claim 14, wherein the report conforms to a JAVASCRIPT OBJECT NOTATION (JSON) format, wherein the HTML element is an HTML5 element, wherein the rendering is performed by a Document Object Model (DOM) script.

16. The computer program product of claim 14, wherein the chart is at least one of a diagram, a graph, a table, a map, and a list, wherein the DM event is detected within the application level of the browser interface, wherein the user interface input is at least one of a drag and drop input, a select input, a multi-select input, a hover input, and a disperse input.

17. The computer program product of claim 14, wherein the chart is at least one of a diagram, a graph, a table, a map, and a list.

18. The computer program product of claim 14, wherein the DM event is at least one of a drag and drop input, a select input, a multi-select input, a hover input, and a disperse input.

19. A method for providing direct manipulation of an analytics data visualization within an analytics report comprising:
- presenting an analytics report within a browser wherein the analytics report consists of at least one analytic information graphic entity;
- detecting a direct manipulation event associated with the at least one analytic information graphic entity, wherein the information graphic entity is at least one of a graphically rendered HTML compliant element and a data set, wherein the analytics report is presented within a browser interface, wherein the direct manipulation action comprises a request for analytics data not in a data set;
- responsive to the detecting, determining an appropriate direct manipulation action by analyzing a direct manipulation ruleset, wherein the direct manipulation action is an immediate rendering of the analytic information graphic based on the direct manipulation event;
- identifying a different data set from a different data repository in response to the request;
- querying the different data set resources to retrieve the requested analytics data; and
- processing the analytics data to generate an enhanced report;
- in generating the enhanced report, converting an analytics chart derived from the analytics data from an Extensible Markup Language (XML) format to a JavaScript Object notation (JSON) format before the enhanced report is generated within the browser, wherein the converting occurs within a presentation layer of the Open Systems Interconnect (OSI) model, wherein the DM action executes at an application level of the browser interface, wherein the conversion is subject to at least one conversion rule, wherein the at least one conversion rule can be dynamically altered during run-time.

* * * * *